United States Patent
Shemesh et al.

(10) Patent No.: US 9,887,969 B1
(45) Date of Patent: Feb. 6, 2018

(54) METHODS FOR OBFUSCATING JAVASCRIPT AND DEVICES THEREOF

(71) Applicant: F5 Networks, Inc., Seattle, WA (US)

(72) Inventors: Yaniv Shemesh, Sammarnish, WA (US); Bryan Appleby, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 25 days.

(21) Appl. No.: 15/144,410

(22) Filed: May 2, 2016

Related U.S. Application Data

(60) Provisional application No. 62/155,675, filed on May 1, 2015.

(51) Int. Cl.
| | |
|---|---|
| *H04L 29/06* | (2006.01) |
| *H04L 9/06* | (2006.01) |
| *H04L 29/08* | (2006.01) |
| *H04L 29/12* | (2006.01) |
| *H04L 12/743* | (2013.01) |

(52) U.S. Cl.
CPC ........ *H04L 63/0428* (2013.01); *H04L 9/0643* (2013.01); *H04L 45/7453* (2013.01); *H04L 61/2007* (2013.01); *H04L 67/02* (2013.01); *H04L 2209/16* (2013.01)

(58) Field of Classification Search
CPC .................................................. H04L 63/0428
See application file for complete search history.

(56) References Cited

U.S. PATENT DOCUMENTS

| | | | | |
|---|---|---|---|---|
| 8,819,819 | B1* | 8/2014 | Johnston | G06F 21/53 709/206 |
| 9,386,037 | B1* | 7/2016 | Hunt | H04L 63/1483 |
| 2011/0137973 | A1* | 6/2011 | Wei | H04L 67/1008 709/202 |
| 2013/0179985 | A1* | 7/2013 | Strassmann | G06F 21/60 726/26 |
| 2013/0346492 | A1* | 12/2013 | Wang | G06F 17/30011 709/203 |
| 2014/0237241 | A1* | 8/2014 | Kurosawa | H04L 63/0428 713/168 |
| 2014/0281535 | A1* | 9/2014 | Kane | H04L 63/0428 713/168 |
| 2016/0014094 | A1* | 1/2016 | Kurabayashi | H04L 63/0428 726/26 |

(Continued)

OTHER PUBLICATIONS

F5 Networks, Inc., "BIG-IP® Application Security Manager™ Implementations", F5 Networks, Inc., Dec. 10, 2014, version 11.6, pp. 1-420.

*Primary Examiner* — Ali Shayanfar
(74) *Attorney, Agent, or Firm* — LeClairRyan, a Professional Corporation

(57) ABSTRACT

A method, non-transitory computer readable medium and device that assists obfuscating JavaScript includes obtaining a webpage requested by a client computing device. A determination of when javascript code is in the source code of the obtained webpage is made. A stored obfuscated javascript code is obtained when the javascript code is determined to be in the source code of the obtained webpage. The obtained obfuscated javascript code is embedded into the obtained webpage and the obtained webpage with the embedded obfuscated javascript code is sent to the requesting client computing device.

16 Claims, 6 Drawing Sheets

(56) References Cited

U.S. PATENT DOCUMENTS

2016/0051199 A1* 2/2016 Tishutin ............... A61B 5/6898
702/190
2016/0212101 A1* 7/2016 Reshadi ............. H04L 63/0414
2017/0048245 A1* 2/2017 Owen ................. G06F 21/6227

* cited by examiner string to base 36 number
---

IN:
"eval"

OUT:
I(693741)

Where I is a function that parses binary to base 36

FIG. 5 output code, including dead code is encrypted and put in a comment so that optimsers / beautifiers will automatically remove it. In this example the real code would be encrypted and inside the comment.

eval((ie9rgb4=function (){var m=(function(){/
* ENCRYPTED_CODE_*/}).toString().slice(14,-3).replace(/\*-/g,'*');for(var
i=0,l,r='';]=m.charCodeAt(i);++i)r+=String.fromCharCode(l<33||l>=126?l:(93+l-(-76E-3+'').charCodeAt(l%6)))%93+33);return r;})())

FIG. 6

```
var startTime = +new Date();
var allowedOffset = 1000;
function checkTimeOffset()
{
    return foundDebugging(startTime +
    allowedOffset < (startTime = +new
Date()));
}
```

FIG. 7

METHODS FOR OBFUSCATING JAVASCRIPT AND DEVICES THEREOF

This application claims the benefit of U.S. Provisional Patent Application Ser. No. 62/155,675, filed May 1, 2015, which is hereby incorporated by reference in its entirety.

FIELD

This technology generally relates to methods and devices for network traffic management and, more particularly, to methods for obfuscating Javascript and devices thereof.

BACKGROUND

Web applications provide end users with client access to server functionality through a set of Web pages. These pages often contain Javascript code to be executed dynamically within the client web browser. However, Web applications, such as web browsers, are subject to attacks, such as cross-site scripting, or cookie theft, among many others.

Of the current attacks on web applications, script injection based attacks are by far the most common. A script injection vulnerability may be present whenever a web application includes data of uncertain origin. In a typical attack, malicious data with surreptitiously embedded scripts is included in requests to a benign web application server. Later, the server may include that data and scripts in web pages it returns to unsuspecting users. Since web browsers execute scripts on a page with web application, these returned scripts can give attackers control over the user's web application activities and/or client devices.

SUMMARY

A method for obfuscating Javascript includes obtaining by an application manager apparatus a webpage requested by a client computing device. A determination of when javascript code is in the source code of the obtained webpage is made by the application manager apparatus. A stored obfuscated javascript code is obtained by the application manager apparatus when the javascript code is determined to be in the source code of the obtained webpage. The obtained obfuscated javascript code is embedded into the obtained webpage and the obtained webpage with the embedded obfuscated javascript code is sent to the requesting client computing device by the application manager apparatus.

A non-transitory computer readable medium having stored thereon instructions for obfuscating Javascript comprising machine executable code which when executed by at least one processor, causes the processor to perform steps includes obtaining a webpage requested by a client computing device. A determination of when javascript code is in the source code of the obtained webpage is made. A stored obfuscated javascript code is obtained when the javascript code is determined to be in the source code of the obtained webpage. The obtained obfuscated javascript code is embedded into the obtained webpage and the obtained webpage with the embedded obfuscated javascript code is sent to the requesting client computing device.

An application manager apparatus including one or more processors coupled to a memory and configured to be capable of executing programmed instructions comprising and stored in the memory to obtain a webpage requested by a client computing device. A determination of when javascript code is in the source code of the obtained webpage is made. A stored obfuscated javascript code is obtained when the javascript code is determined to be in the source code of the obtained webpage. The obtained obfuscated javascript code is embedded into the obtained webpage and the obtained webpage with the embedded obfuscated javascript code is sent to the requesting client computing device.

This technology provides a number of advantages including providing a method, non-transitory computer readable medium and apparatus that effectively assists with obfuscating Javascript. By embedding the obtained obfuscated JavaScript code into the obtained webpage, the technology disclosed herein is able to prevent theft of sensitive information present in the JavaScript code and make it harder to reverse engineer the JavaScript code.

BRIEF DESCRIPTION OF THE DRAWINGS

FIG. 5 is an exemplary code for performing code complexation;

FIG. 6 is an exemplary code for anti-deobfuscation or detection; and

FIG. 7 is an exemplary Javascript code.

DETAILED DESCRIPTION

Figure 1:
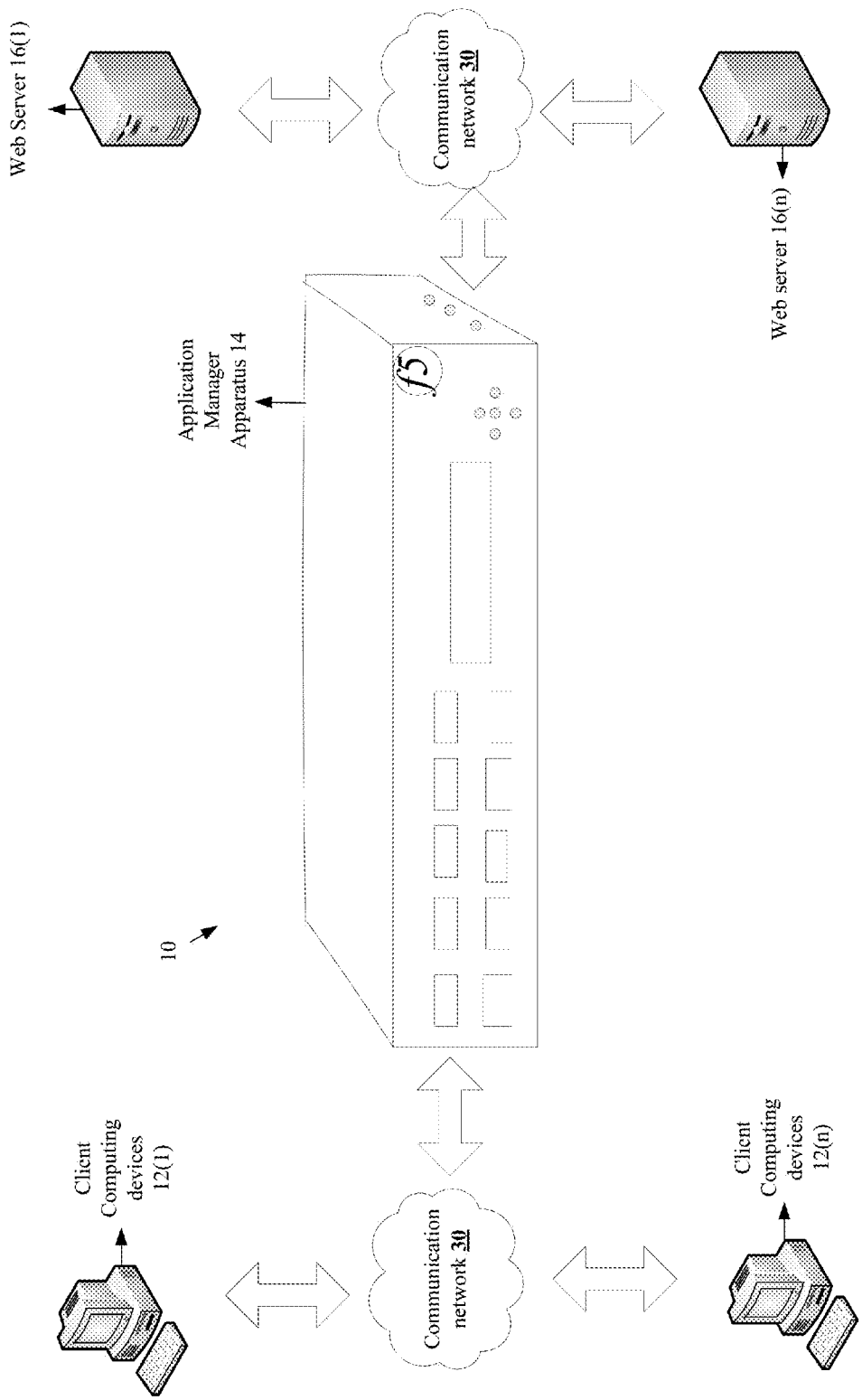
FIG. 1 is an example of a block diagram of an environment including an application manager apparatus for obfuscating Javascript.
Figure 2:
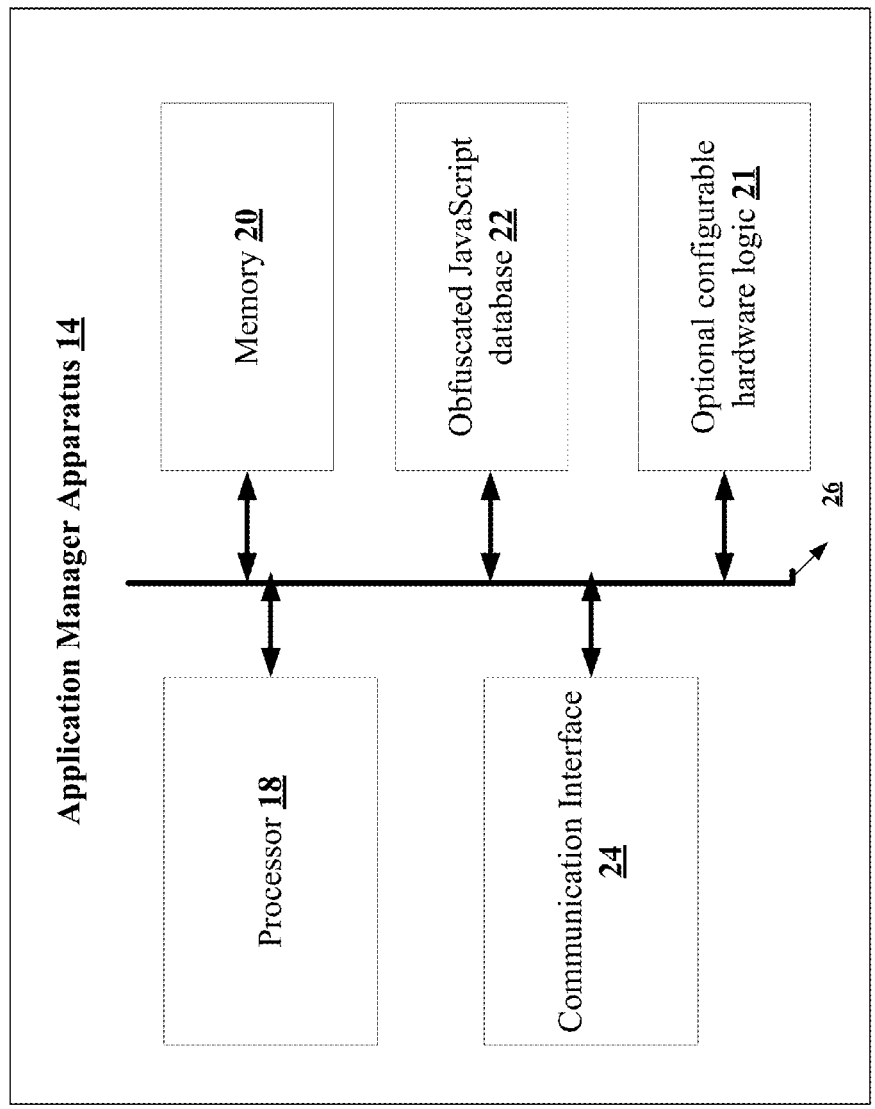
FIG. 2 is an example of a block diagram of the application manager apparatus.

An example of a network environment 10 for obfuscating Javascript with the application manager apparatus 14 is illustrated in FIGS. 1 and 2. The exemplary environment 10 includes a plurality of client computing devices 12(1)-12(n), an application manager apparatus 14, and a plurality of web servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including obfuscating Javascript.

Referring more specifically to FIGS. 1 and 2, application manager apparatus 14 is coupled to the plurality of client computing devices 12(1)-12(n) through the communication network 30, although the plurality of client computing devices 12(1)-12(n), and application manager apparatus 14 may be coupled together via other topologies. Additionally, application manager apparatus 14 is coupled to the plurality of web servers 16(1)-16(n) through the communication network 30, although the plurality of web servers 16(1)-16(n) and application manager apparatus 14 may be coupled together via other topologies.

The application manager apparatus 14 assists with obfuscating Javascript as illustrated and described by way of the examples herein, although application manager apparatus 14 may perform other types and/or numbers of functions. As illustrated in FIG. 2, the application manager apparatus 14 may include a processor or central processing unit (CPU) 18, a memory 20, optional configurable hardware logic 21, obfuscated Javascript database 22, and a communication system 24 which are coupled together by a bus 26, although the application manager apparatus 14 may comprise other types and numbers of elements in other configurations. In this example, the bus 26 is a PCI Express bus in this example, although other bus types and links may be used.

The processor 18 within the application manager apparatus 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
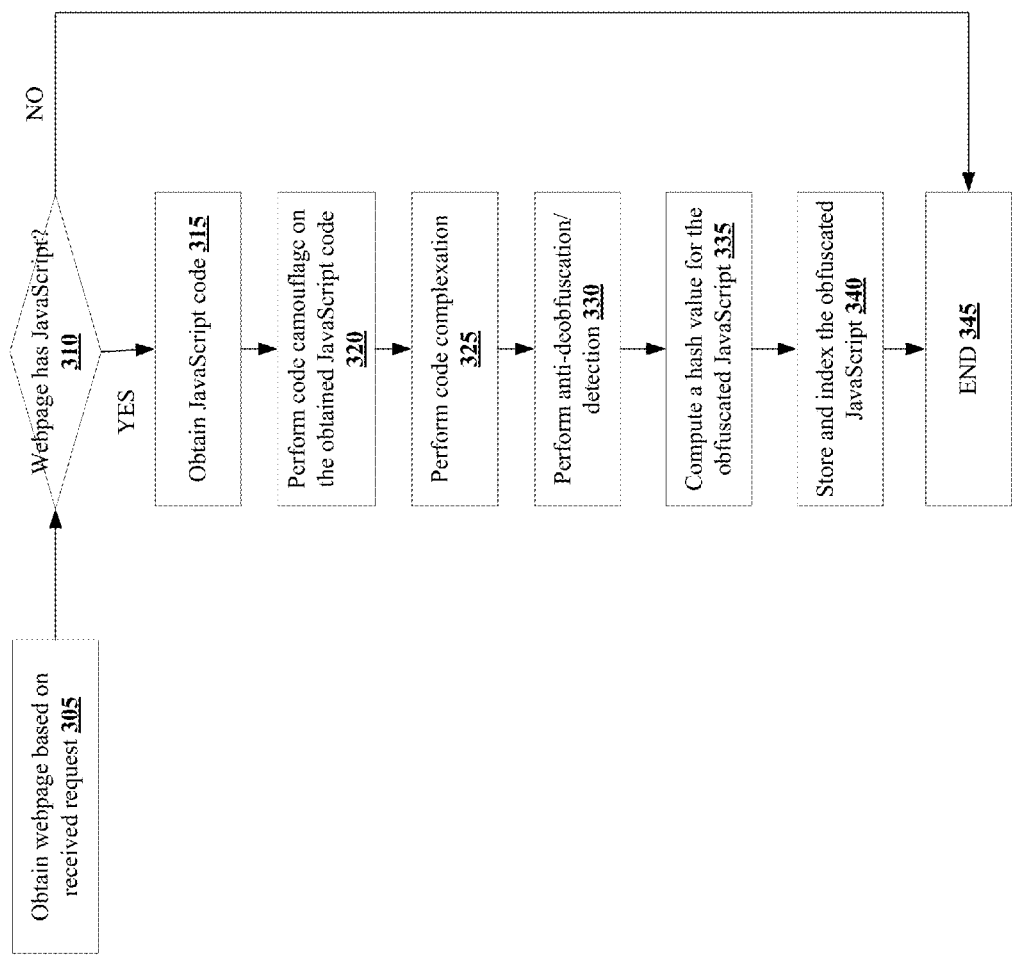
FIG. 3 is an exemplary flowchart of a method for obfuscating Javascript.
Figure 4:
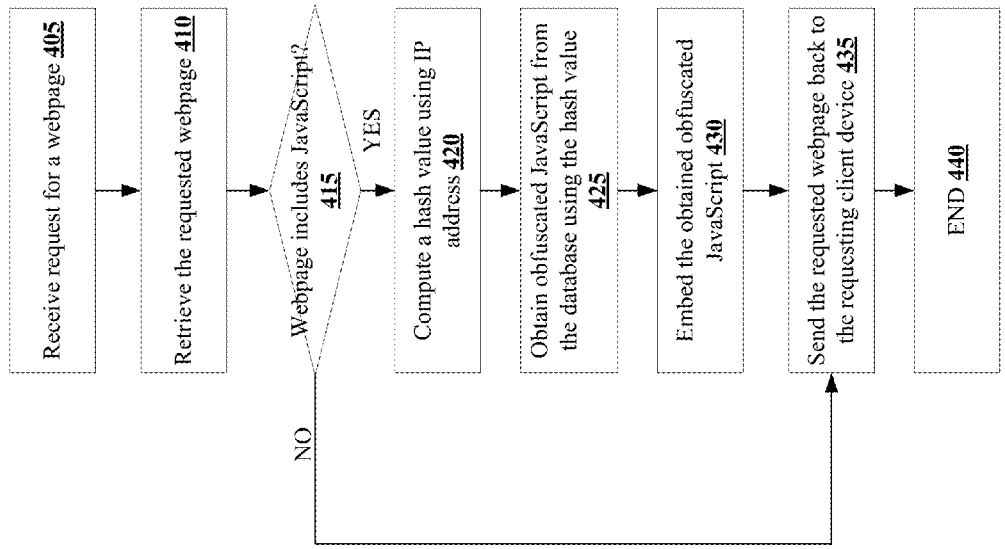
FIG. 4 is an exemplary flowchart of a method for using the obfuscating Javascript.

Memory 20 within the application manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3-4 are representative of example steps or actions of this technology that may be embodied or expressed as one or more non-transitory computer or machine readable instructions stored in memory 20 that may be executed by the processor 18 and/or may be implemented by configured logic in the optional configurable logic 21.

Accordingly, the memory of the application manager apparatus 14 can store one or more applications that can include computer executable instructions that, when executed by the application manager apparatus 14, causes the application manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the application manager apparatus 14 itself, may be located in virtual server(s) running in a cloud-based computing environment rather than being tied to one or more specific physical network computing devices. Also, the application(s) may be running in one or more virtual machines (VMs) executing on the application manager apparatus 14. Additionally, in at least one of the various embodiments, virtual machine(s) running on the mobile application manager apparatus may be managed or supervised by a hypervisor.

The optional configurable hardware logic 21 in the application manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the application manager apparatus 14 is used to operatively couple and communicate between the application manager apparatus 14, the plurality of client computing devices 12(1)-12(n), and the plurality of web servers 16(1)-16(n) which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n), include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of web servers 16(1)-16(n) via the application manager apparatus 14. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the application manager apparatus 14 to conduct one or more operations with the plurality of web servers 16(1)-16(n), such as to obtain data from one of the plurality of web servers 16(1)-16(n), by way of example only, although other numbers and/or types of systems could be utilizing these resources and other types and numbers of functions utilizing other types of protocols could be performed.

Each of the plurality of web servers 16(1)-16(n) include a central processing unit (CPU) or processor, a memory, and a communication system, which are coupled together by a bus or other link, although other numbers and/or types of network devices could be used. Generally, the plurality of web servers 16(1)-16(n) process requests for providing access to one or more enterprise web applications received from the plurality of client computing devices 12(1)-12(n), application manager apparatus 14, via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), or the application manager apparatus 14. The plurality of web servers 16(1)-16(n) may provide data or receive data in response to requests directed toward the respective applications on the plurality of web servers 16(1)-16(n) from the plurality of client computing devices 12(1)-12(n) or the application manager apparatus 14. It is to be understood that the plurality of web servers 16(1)-16(n) may be hardware or software or may represent a system with multiple external resource servers, which may include internal or external networks. In this example the plurality of web servers 16(1)-16(n) may be any version of Microsoft® IIS servers or Apache® servers, although other types of servers may be used.

Although the plurality of web servers 16(1)-16(n) are illustrated as single web application servers, one or more actions of each of the servers 16(1)-16(n) may be distributed across one or more distinct network computing devices. Moreover, the servers 16(1)-16(n) are not limited to a particular configuration. Thus, the plurality servers 16(1)-16(n) may contain a plurality of network computing devices that operate using a master/slave approach, whereby one of the network computing devices of the servers 16(1)-16(n) operate to manage and/or otherwise coordinate operations of the other network computing devices. The plurality of web servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, one or more of the servers 16(1)-16(n) depicted in FIG. 1 can operate within application manager apparatus 14 rather than as a stand-alone server communicating with application manager apparatus 14 via the communication network(s) 30. In this example the servers 16(1)-16(n) operate within the memory of the application manager apparatus 14.

While application manager apparatus 14 is illustrated in this example as including a single device, application manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise application manager apparatus 14 in other examples can be standalone devices or integrated with one or more other devices or applications, such as one of the plurality of web servers 16(1)-16(n) or, the application manager apparatus 14, or applications coupled to the communication network(s), for example. Moreover, one or more of the devices of application manager apparatus 14 in these examples can be in a same or a different communication network 30 including one or more public, private, or cloud networks, for example.

Although an exemplary environment 10 with the plurality of client computing devices 12(1)-12(n), the application manager apparatus 14, and the plurality of web servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network, such as application manager apparatus 14, plurality of client computing devices 12(1)-12(n), or plurality of web servers 16(1)-16(n), for example, may be configured to operate as virtual instances on the same physical machine. In other words, one or more of application manager apparatus 14, plurality of client computing devices 12(1)-12(n), or plurality of web servers 16(1)-16(n) illustrated in FIG. 1 may operate on the same physical device rather than as separate devices communicating through a network as depicted in FIG. 1. There may be more or fewer plurality of client computing devices 12(1)-12(n), application manager apparatus 14, or plurality of web servers 16(1)-16(n) than depicted in FIG. 1. The plurality of client computing devices 12(1)-12(n) or the plurality of web servers 16(1)-16(n) could be implemented as applications on application manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for obfuscating Javascript will now be described with reference to FIGS. 1-7. First, a method for obfuscating a JavaScript code will be illustrated with reference to FIG. 3. In 305, the application manager apparatus 14 obtains a webpage from one of the plurality of web servers 16(1)-16(n) responsive to a request received from one of the plurality of client computing devices 12(1)-12(n), although the application manager apparatus can obtain the webpage from other locations.

Next in step 310, the application manager apparatus 310 determines when JavaScript code is in web page by scanning source code of the obtained webpage, although the application manager apparatus 14 can use other techniques to make the determination. Accordingly, when the application manager apparatus 14 determines that the obtained webpage does not include the JavaScript code, then the No branch is taken to step 345.

In step 345, the application manager apparatus 14 forwards the obtained webpage back to the requesting one of the plurality of client computing devices 12(1)-12(n) and the exemplary method ends.

However back in step 310, when the application manager apparatus 14 determines that the obtained webpage includes the JavaScript code, then the Yes branch is taken to step 315.

In step 315, the application manager apparatus 14 obtains the JavaScript code from the obtained webpage to perform Javascript obfuscation techniques on the obtained Javascript code, although the application manager apparatus 14 can obtain the JavaScript code from other sources and/or perform other types and/or numbers of other obfuscation operations.

Next in step 320, the application manager apparatus 14 performs code camouflage on the obtained JavaScript code. In this example, performing code camouflage relates to injecting dynamic dead code into the obtained JavaScript code. By way of example only, the dynamic dead code that is injected into the obtained JavaScript code is a JavaScript code similar to the obtained JavaScript code but does not perform any function when executed by a web browser on one of the plurality of client computing devices 12(1)-12(n).

Next in step 325, the application manager apparatus 14 performs code complexation on the code camouflaged JavaScript. In this example, performing code complexation relates to dynamically changing the obfuscation methods for each response, splitting strings within the camouflaged JavaScript code to substrings with alternating quotes and encoding characters using in-built function in JavaScript such as "fromCharCode", which is hereby incorporated by its reference in its entirety. Additionally in code complexation, the application manager apparatus 14 renames the variables and functions of the JavaScript code, randomly reorders consecutive functions declarations, Unicode encoding of variables or functions or statements, and converting strings to Base36. An exemplary code for converting strings to Base 36 is illustrated in FIG. 5. Furthermore, the application manager apparatus 14 converts properties of the JavaScript code to strings, enumerate known object properties sequence to avoid specifying a property by its name, build statements strings from other statements, replace existing code with complex code snippets or expressions and add commas operator expression to existing code while performing the code complexation. Additionally, the application manager apparatus 14 can use code minifier, code optimizer and dictionary to compress repeated code strings within the camouflaged JavaScript code while performing the code complexation. Further, the application manager apparatus 14 formats strings as uniform resource locators to hide the formatted strings when they are debugged and also convert code to strings as part of performing the code complexation.

In the next step 330, the application manager apparatus 14 performs anti-debofuscation or detection. In this example, performing anti-deobfuscation or detection relates to sending an attacker of the JavaScript to random or dynamic code execution path parts when debugging or code manipulation of the JavaScript is detected by the application manager apparatus 14. Additionally, performing anti-deobfuscation or detection includes searching or replacing decoded Unicode strings with function body associated with a function present in the JavaScript code. Further, while performing anti-deobfuscation or detection application manager apparatus 14 hides JavaScript code inside functions comments as illustrated in FIG. 6, detecting when the JavaScript code runs in global scope instead of in anonymous function, using an original function (such as eval, that is easily recognizable by a person having ordinary skill in the art and incorporated herein by its reference in its entirety) by using the definition inside a blank iframe, detecting unauthorized variable definitions by diffing current page with an iframe of the same url and making sure that each function validates its own signature to make sure it was not changed from the original using checksum techniques. Additionally, de-obfuscation includes the application manager apparatus 14 to check each function with its call stack to detect unauthorized function calls, limiting invocation calls to a function using a counter, detecting breakpoints in each function by setting maximum threshold of the time it takes for the JavaScript code to execute using exemplary code illustrated in FIG. 7, and sending alert when code is executing in a domain which is not in a predefined list of domains (hostnames). Furthermore, during the code de-obfuscation or detection, the application manager apparatus 14 makes the JavaScript code expire after a certain threshold time, using existing functions such as eval, setTimeout, document write in Java, and preventing overwriting of native methods.

Once the above three steps are completed, the obfuscation of the obtained JavaScript code in the obtained webpage has been completed, although again other types, numbers and/or combinations of obfuscation techniques could be used. Next in step 335, the application manager apparatus 14 computes a hash value for the obfuscated JavaScript code using the internet protocol address of the requesting one of the plurality of client computing devices 12(1)-12(n), although the application manager apparatus 14 can compute a hash value using other techniques.

Next in step 340, the application manager apparatus 14 stores the obfuscated JavaScript in the obfuscated JavaScript database and indexes the obfuscated JavaScript using the computed hash value, although the application manager apparatus 14 can store and index the obfuscated JavaScript at other locations using other parameters and the exemplary method ends. Additionally, the application manager apparatus 14 injects the obfuscated JavaScript code into the obtained webpage and forwards the obtained webpage back to the requesting one of the plurality of client computing devices 12(1)-12(n) and the exemplary method ends at step 345.

Now an exemplary method for using the above illustrated obfuscated JavaScript will be illustrated with reference to an exemplary flowchart FIG. 4. First in step 405, the application manager apparatus 14 receives a request for a webpage from one of the plurality of client computing devices 12(1)-12(n), although the application manager apparatus 14 can receive other types or amounts of requests from other devices.

In the next step 410, the application manager apparatus 14 retrieves the requested webpage from one of the plurality of web servers 16(1)-16(n), although the application manager apparatus 14 can retrieve the requested webpage from other locations.

Next in step 415, the application manager apparatus 14 determines when the retrieved webpage includes a JavaScript code. In this example, the application manager apparatus 14 scans the source code of the retrieved webpage to determine for the presence of a JavaScript code, although the application manager apparatus 14 can use other techniques to determine when there is a JavaScript code in the retrieved webpage. Accordingly, when the application manager apparatus 14 determines that the retrieved webpage does not include a JavaScript code, then the No branch is taken to step 435 which will be further illustrated below.

However, when the application manager apparatus 14 determines that the retrieved webpage includes the JavaScript code, then the Yes branch is taken to step 420.

In step 420, the application manager apparatus 14 determines a hash value using the internet protocol (IP) address of the requesting one of the plurality of client computing devices 12(1)-12(n), although the application manager apparatus 14 can use other parameters for determining the hash value.

In the next step 425, the application manager apparatus 14 using the determined hash value, obtains a stored obfuscated JavaScript code from the obfuscated JavaScript database 22, although the application manager apparatus 14 can use other parameters to obtain the stored obfuscated JavaScript code. In this example, the application manager apparatus 14 compares the determined hash value against all the stored hash value in the obfuscated JavaScript database and obtains the obfuscated JavaScript code that is associated with the stored hash value that exactly matches the determined hash value.

Next in step 430, the application manager apparatus 14 embeds the obtained stored obfuscated JavaScript code into the obtained webpage. By embedding the obtained obfuscated JavaScript code into the obtained webpage, the technology disclosed herein is able to prevent theft of sensitive information present in the JavaScript code and make it harder to reverse engineer the JavaScript code.

In the next step 435, the application manager apparatus 14 forwards the obtained webpage with the embedded obfuscated JavaScript code back to the requesting one of the plurality of client computing devices 12(1)-12(n) and the exemplary method ends in step 440. Alternatively, the application manager apparatus 14 can also forward the requested webpage to the requesting one of the plurality of client computing devices 12(1)-12(n) without embedding the obtained obfuscated JavaScript code when the application manager apparatus 14 determines that there was no JavaScript code present in the requested webpage that was initially obtained.

Optionally, upon forwarding the requested webpage back to the requesting one of the plurality of client computing devices 12(1)-12(n), the application manager apparatus 14 can continue to monitor the subsequent requests sent from the requesting one of the plurality of client computing devices 12(1)-12(n). When one of the subsequent messages includes an alert message sent from the web browser executing on the requesting one of the plurality of client computing devices 12(1)-12(n) indicating that the embedded obfuscated JavaScript code was tampered or changed by a hacker, the application manager apparatus 14 can forward the alert message to an alert server (not shown). The alert server can then send the necessary instructions back to the application manager apparatus 14 that includes information about managing the threat by the hacker on the requesting one of the plurality of client computing devices 12(1)-12(n).

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for obfuscating javascript code in a webpage, the method implemented by a network traffic management system, the method comprising:
    obtaining a webpage requested by a client from a server of a plurality of servers, where the server is selected from the plurality of servers based a load balancing decision;
    determining when javascript code is in source code of the obtained webpage;
    obtaining a stored obfuscated javascript code when the javascript code is determined to be in the source code of the obtained webpage;
    embedding the obtained obfuscated javascript code into the obtained webpage and sending the obtained webpage with the embedded obfuscated javascript code to the requesting client, or wherein the obtained webpage is sent to the requesting client without embedding the obtained obfuscated javascript code when the javascript code is determined to be absent in the source code of the obtained webpage;
    receiving an alert message from the requesting client when the embedded obfuscated javascript code is tampered with, when the obtained webpage is transmitted with the obfuscated javascript, wherein the receiving further comprises sending the received alert message to an alert server.

2. The method as set forth in claim 1 wherein the obtaining further comprises:
    determining a hash value using an internet protocol address of the requesting client; and
    obtaining the stored obfuscated javascript code based on the determined hash value.

3. The method as set forth in claim 1 further comprising:
    generating the obfuscated javascript code in response to a previous request for the webpage using one or more javascript obfuscation techniques; and
    storing the generated obfuscated javascript code associated with the webpage.

4. The method as set forth in claim 3 wherein the one or more javascript obfuscation techniques comprising one or more of, a code camouflage technique, a code complexation technique, or a code anti-de obfuscation technique.

5. A non-transitory computer readable medium having stored thereon instructions for obfuscating javascript code in a webpage comprising machine executable code which when executed by at least one processor, causes the processor to:
    obtain a webpage requested by a client computing device;
    determine when javascript code is in source code of the obtained webpage;
    obtain a stored obfuscated javascript code when the javascript code is determined to be in the source code of the obtained webpage;
    embed the obtained obfuscated javascript code into the obtained webpage and send the obtained webpage with the embedded obfuscated javascript code to the requesting client computing device, or wherein the obtained webpage is sent to the requesting client computing device without embedding the obtained obfuscated javascript code when the javascript code is determined to be absent in the source code of the obtained webpage;

receive an alert message from the requesting client computing device when the embedded obfuscated javascript code is tampered with, when the obtained webpage is transmitted with the obfuscated javascript, wherein the receiving further comprises sending the received alert message to an alert server.

6. The medium as set forth in claim 5 wherein the obtaining further comprises:
determining a hash value using an internet protocol address of the requesting client computing device; and
obtaining the stored obfuscated javascript code based on the determined hash value.

7. The medium as set forth in claim 5 further comprising:
generating the obfuscated javascript code in response to a previous request for the webpage using one or more javascript obfuscation techniques; and
storing the generated obfuscated javascript code associated with the webpage.

8. The medium as set forth in claim 7 wherein the one or more javascript obfuscation techniques comprising one or more of, a code camouflage technique, a code complexation technique, or a code anti-de obfuscation technique.

9. A network traffic manager apparatus, comprising memory comprising programmed instructions stored in the memory and one or more processors configured to be capable of executing the programmed instructions stored in the memory to:
obtain a webpage requested by a client computing device;
determine when javascript code is in source code of the obtained webpage;
obtain a stored obfuscated javascript code when the javascript code is determined to be in the source code of the obtained webpage;
embed the obtained obfuscated javascript code into the obtained webpage and send the obtained webpage with the embedded obfuscated javascript code to the requesting client computing device, or wherein the obtained webpage is sent to the requesting client computing device without embedding the obtained obfuscated javascript code when the javascript code is determined to be absent in the source code of the obtained webpage;
receive an alert message from the requesting client computing device when the embedded obfuscated javascript code is tampered with, when the obtained webpage is transmitted with the obfuscated javascript, wherein the receiving further comprises sending the received alert message to an alert server.

10. The device as set forth in claim 9 wherein the one or more processors are further configured to be capable of executing the programmed instructions stored in the memory to:
determine a hash value using an internet protocol address of the requesting client computing device; and
obtain the stored obfuscated javascript code based on the determined hash value.

11. The device as set forth in claim 9 wherein the one or more processors are further configured to be capable of executing the programmed instructions stored in the memory to:
generate the obfuscated javascript code in response to a previous request for the webpage using one or more javascript obfuscation techniques; and
store the generated obfuscated javascript code associated with the webpage.

12. The device as set forth in claim 11 wherein the one or more javascript obfuscation techniques comprising one or more of, a code camouflage technique, a code complexation technique, or a code anti-de obfuscation technique.

13. A network traffic management system, comprising one or more traffic management apparatuses, client devices, or server devices, the network traffic management system comprising memory comprising programmed instructions stored thereon and one or more processors configured to be capable of executing the stored programmed instructions to:
obtain a webpage requested by a client computing device;
determine when javascript code is in source code of the obtained webpage;
obtain a stored obfuscated javascript code when the javascript code is determined to be in the source code of the obtained webpage;
embed the obtained obfuscated javascript code into the obtained webpage and send the obtained webpage with the embedded obfuscated javascript code to the requesting client computing device, or wherein the obtained webpage is sent to the requesting client computing device without embedding the obtained obfuscated javascript code when the javascript code is determined to be absent in the source code of the obtained webpage;
receive an alert message from the requesting client computing device when the embedded obfuscated javascript code is tampered when the obtained webpage is transmitted with the obfuscated javascript, wherein the receiving further comprises sending the received alert message to an alert server.

14. The network traffic management system of claim 13, wherein the one or more processors are further configured to be capable of executing the programmed instructions stored in the memory to:
determine a hash value using an internet protocol address of the requesting client computing device; and
obtain the stored obfuscated javascript code based on the determined hash value.

15. The network traffic management system of claim 13, wherein the one or more processors are further configured to be capable of executing the programmed instructions stored in the memory to:
generate the obfuscated javascript code in response to a previous request for the webpage using one or more javascript obfuscation techniques; and
store the generated obfuscated javascript code associated with the webpage.

16. The network traffic management system of claim 15 wherein the one or more javascript obfuscation techniques comprising one or more of, a code camouflage technique, a code complexation technique, or a code anti-de obfuscation technique.

* * * * *

UNITED STATES PATENT AND TRADEMARK OFFICE
CERTIFICATE OF CORRECTION

PATENT NO. : 9,887,969 B1
APPLICATION NO. : 15/144410
DATED : February 6, 2018
INVENTOR(S) : Shemesh et al.

Page 1 of 1

It is certified that error appears in the above-identified patent and that said Letters Patent is hereby corrected as shown below:

In the Claims

In Claim 1, Column 10, Line 11, after "based", insert --on--

Signed and Sealed this
Tenth Day of April, 2018

Andrei Iancu
*Director of the United States Patent and Trademark Office*